US007130736B2

(12) United States Patent
Bishop et al.

(10) Patent No.: US 7,130,736 B2
(45) Date of Patent: Oct. 31, 2006

(54) ENGINE SPEED STABILIZATION USING FUEL RATE CONTROL

(75) Inventors: Kevin P. Bishop, Naperville, IL (US); Walter P. Gorczowski, Homer Glen, IL (US); Suresh L. Satyavolu, Wheaton, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 39 days.

(21) Appl. No.: 10/775,619

(22) Filed: Feb. 10, 2004

(65) Prior Publication Data

US 2005/0177301 A1 Aug. 11, 2005

(51) Int. Cl.
*B60T 7/12* (2006.01)

(52) U.S. Cl. ...................... 701/104; 701/110; 123/352; 123/379

(58) Field of Classification Search ................ 701/104, 701/110; 123/352, 357, 364, 379
See application file for complete search history.

(56) References Cited

U.S. PATENT DOCUMENTS

| | | | | | |
|---|---|---|---|---|---|
| 4,086,884 | A * | 5/1978 | Moon et al. | ................ | 123/480 |
| 4,403,473 | A * | 9/1983 | Gladden | ...................... | 60/274 |
| 5,119,300 | A * | 6/1992 | Bartke et al. | ............... | 701/114 |
| 5,474,052 | A * | 12/1995 | Aquino et al. | .............. | 123/675 |
| 6,425,370 | B1 * | 7/2002 | Kramer | ...................... | 123/357 |
| 6,654,678 | B1 * | 11/2003 | Rodriguez | .................. | 701/104 |
| 6,786,198 | B1 * | 9/2004 | Miranda et al. | ............ | 123/352 |
| 6,810,855 | B1 * | 11/2004 | Hasegawa et al. | .......... | 123/445 |
| 6,848,427 | B1 * | 2/2005 | Song et al. | ................. | 123/486 |
| 6,850,835 | B1 * | 2/2005 | Barnes et al. | ............... | 701/114 |
| 6,968,829 | B1 * | 11/2005 | Joos et al. | .................. | 123/490 |
| 2004/0244471 | A1 * | 12/2004 | Sawada et al. | ............. | 073/116 |

* cited by examiner

*Primary Examiner*—Willis R. Wolfe
*Assistant Examiner*—Johnny H. Hoang
(74) *Attorney, Agent, or Firm*—Dennis K. Sullivan; Susan L. Lukasik; Jeffrey P. Calfa

(57) ABSTRACT

Idle speed stability is imparted to a compression ignition engine by processing data values for actual engine speed and desired engine speed to yield a data value for engine speed error; processing (22) the data value for engine speed error according to a governor algorithm for yielding a data value for a mass fuel rate for governed fueling of the engine; c) processing (24) the data value for mass fuel rate for governed fueling of the engine and the data value for actual engine speed to yield a data value for a quantity of fuel to be injected into an engine cylinder during an ensuing stroke of a piston within the cylinder; and d) injecting (30) that quantity of fuel into the cylinder during that stroke.

35 Claims, 7 Drawing Sheets

ENGINE SPEED STABILIZATION USING FUEL RATE CONTROL

FIELD OF THE INVENTION

This invention relates generally to internal combustion engines. More specifically it relates to a novel strategy for improving engine idle speed stability, particularly in compression ignition engines.

BACKGROUND OF THE INVENTION

Poor idle speed stability arising from changes in engine load, even small ones, has been recognized as a seemingly inherent operating characteristic of a basic diesel engine. Speed instability manifests itself by engine speed oscillating and/or wandering in consequence of a load change, rather than quickly stabilizing at a constant speed.

Various devices, special flyball governors for example, have been added to diesel engines in attempts to secure better speed stability. While some improvements have been made over the many years that diesel engines have been in existence, the inventors believe it is fair to state that none has been able to achieve complete success in overcoming this seemingly inherent and undesirable characteristic of such engines.

Control of engine idle speed in a governed diesel engine has been historically based on controlling the quantity of fuel introduced into each cylinder during the stroke of a piston that reciprocates within a cylinder, i.e. a fuel quantity-per-stroke basis. By their observation that a diesel engine is capable of operating at any of multiple different speeds using approximately the same fuel quantity per stroke, the inventors believe that a governing strategy that controls idle speed using strictly fuel quantity-per-stroke cannot provide an effective solution for idle speed control.

That a known idle speed governor embodying a known governing algorithm acting to control engine fueling via known devices and hardware is prone to instability when operating on a fuel quantity-per-stroke basis, is illustrated by the following situations.

If the idle speed governor is locked to a particular quantity of fuel per stroke in order to run the engine at a desired idle speed, any change that decreases engine speed, such as a change in engine load due to an engine-driven accessory being activated, will necessarily decrease the fueling rate to the engine. In other words, because the engine slows, there will be fewer strokes per unit of time while the quantity of fuel per stroke remains unchanged. That is exactly the opposite of what the engine actually needs in order to maintain desired idle speed, and consequently idle speed becomes unstable, at least temporarily.

If the idle speed governor is locked to that same particular quantity of fuel per stroke in order to run the engine at the same desired idle speed, any change that increases engine speed, such as a change in engine load due to the engine-driven accessory being de-activated, will necessarily increase the fueling rate to the engine. In other words, because the engine speeds up, there will be more strokes per unit of time while the quantity of fuel per stroke remains unchanged. That is exactly the opposite of what the engine actually needs in order to maintain desired idle speed, and consequently idle speed becomes unstable, at least temporarily.

While the advent of electronic control systems has yielded significant advances in diesel engine control technology and resulting engine performance, governing strategies have continued to rely on quantity-per-stroke as the basis for idle speed control. The evolution of electronic diesel engine control systems has resulted in the use of separate electronic modules for engine control and for fuel control, and their presence has created further complications for idle speed governing. An engine control module is sometimes referred to as an ECM, and a fuel control module as an ICM (injector control module), and although they are able to communicate with each other, each has its own separate processing system.

The use of separate ECM and ICM modules has placed added demand on the idle speed governor, tending to make stabilization of idle speed more difficult. This is essentially due to communications and scheduling delays between the different modules creating phase shift between the instant of time at which engine speed is measured and the instant of time at which a resulting fueling change can occur in consequence of a change in engine speed.

In any feedback control system, an electronic engine governor being one example, phase shift is commonly a limiting factor in tuning the gain of the control loop. Increasing phase shift tends to make the control less stable and ultimately unstable if the phase shift becomes too large.

The combination of the idle speed instability that is seemingly inherent in a diesel engine and the added phase shift resulting from the use of separate electronic modules is believed counterproductive to the objective of optimizing idle speed control in an engine governor. If the control loop gain is de-tuned to achieve stability, the engine responds poorly when engine load changes. If the gain is increased for better response, the system tends toward instability.

The inventors believe that a fundamental change in the strategy for control of the engine idle speed in a governed diesel engine is essential for attainment of the best possible way to optimize engine idle speed control.

SUMMARY OF THE INVENTION

The present invention relates to an improvement in diesel engine control system strategy for avoiding instability in idle speed.

One generic aspect of the present invention relates to a method for governing a compression ignition engine. The method comprises a) processing data values for actual engine speed and desired engine speed to yield a data value for engine speed error; b) processing the data value for engine speed error according to a governor algorithm for yielding a data value for a mass fuel rate for governed fueling of the engine; c) processing the data value for mass fuel rate for governed fueling of the engine and the data value for actual engine speed to yield a data value for a quantity of fuel to be injected into an engine cylinder during an ensuing stroke of a piston within the cylinder; and d) injecting that quantity of fuel into the cylinder during that stroke.

Another generic aspect relates to a compression ignition internal combustion engine comprising multiple cylinders into which a fueling system injects fuel during engine cycles, an engine control system that comprises a governor for governing the engine, and a data processing system for processing various data useful in governing the engine including data values for actual engine speed and desired engine speed.

The data processing system repeatedly i) processes the data values for actual engine speed and desired engine speed to yield data values for engine speed error, ii) processes the data values for engine speed error according to an algorithm for yielding data values for mass fuel rate for fueling the engine, iii) processes the data values for mass fuel rate for fueling the engine and the data values for actual engine speed to yield data values for quantities of fuel to be injected into the engine cylinders during ensuing strokes of pistons within the respective cylinders; and iv) causes the fueling system to inject those quantities of fuel into the respective cylinders during respective ensuing strokes.

Still another generic aspect relates to the control system just described.

Still another generic aspect relates to a method for governing idle speed of a compression ignition engine. The method comprises a) processing data values for actual engine speed and desired idle speed to yield a data value for speed error; b) processing the data value for speed error according to an algorithm for yielding a data value for a mass fuel rate for fueling the engine; c) processing the data value for mass fuel rate for fueling the engine and the data value for actual engine speed to yield a data value for a quantity of fuel to be injected into an engine cylinder during an ensuing stroke of a piston within the cylinder; and d) injecting that quantity of fuel into the cylinder during that stroke. Another generic aspect relates to a compression ignition internal combustion engine comprising multiple cylinders into which a fueling system injects fuel during engine cycles and an engine control system that comprises i) a low-idle governor for governing engine fueling to run the engine at low idle speed by issuing a fueling command measured in fueling rate units of measurement, ii) a conversion function for converting the fueling command from fueling rate units of measurement to quantity-per-stroke units of measurement, and iii) an accelerator for accelerating the engine from low idle speed by issuing a fueling command measured in quantity-per-stroke units of measurement. When the engine is running at low idle speed, fuel is injected into the cylinders in quantities-per-stroke set by the conversion function, and when the engine is accelerated from low idle speed the fueling command from the accelerator is used to set the quantities-per-stroke injected into the cylinders.

Another generic aspect relates to the control system as just described.

Still another generic aspect relates to the method embodied in the control system for governing the engine at low idle speed and then accelerating the engine.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
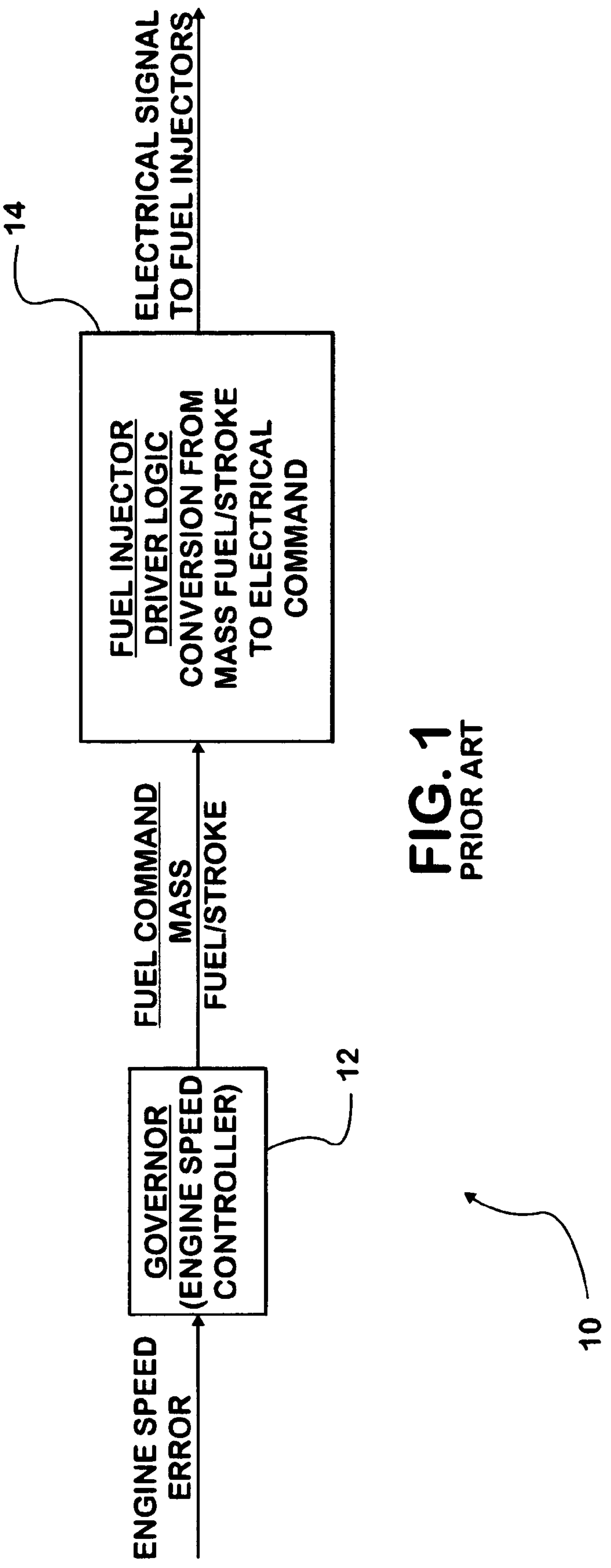
FIG. 1 PRIOR ART
FIG. 1 is a general diagram of a prior governing strategy for diesel engine idle speed control.

FIG. 1 shows a known governing strategy 10 for a diesel engine. The strategy can be implemented in a processor-based engine control system using an appropriate algorithm to govern engine idle speed.

Strategy 10 comprises processing data values for actual engine speed and desired engine idle speed to yield a data value for engine speed error that forms a data input to a governor 12. Governor 12 is implemented, in an ECM for example, as an appropriate governor algorithm programmed into the processing system of the ECM. Governor 12 processes the data value for engine speed error according to the algorithm to yield a data value for engine fueling in terms of quantity-per-stroke, such as fuel mass per stroke in any appropriate unit of measurement, such as milligrams per stroke.

That data value is communicated to fuel injector driver logic 14 that is present, in an ICM for example, to control fuel injectors of the engine fueling system. Driver logic 14 converts the quantity-per-stroke data value via an appropriate algorithm programmed into its processing system into electric signals that when applied to the fuel injectors cause the quantity of fuel corresponding to the data value from governor 12 to be injected into each cylinder at the proper time in the engine cycle.

Figure 2:
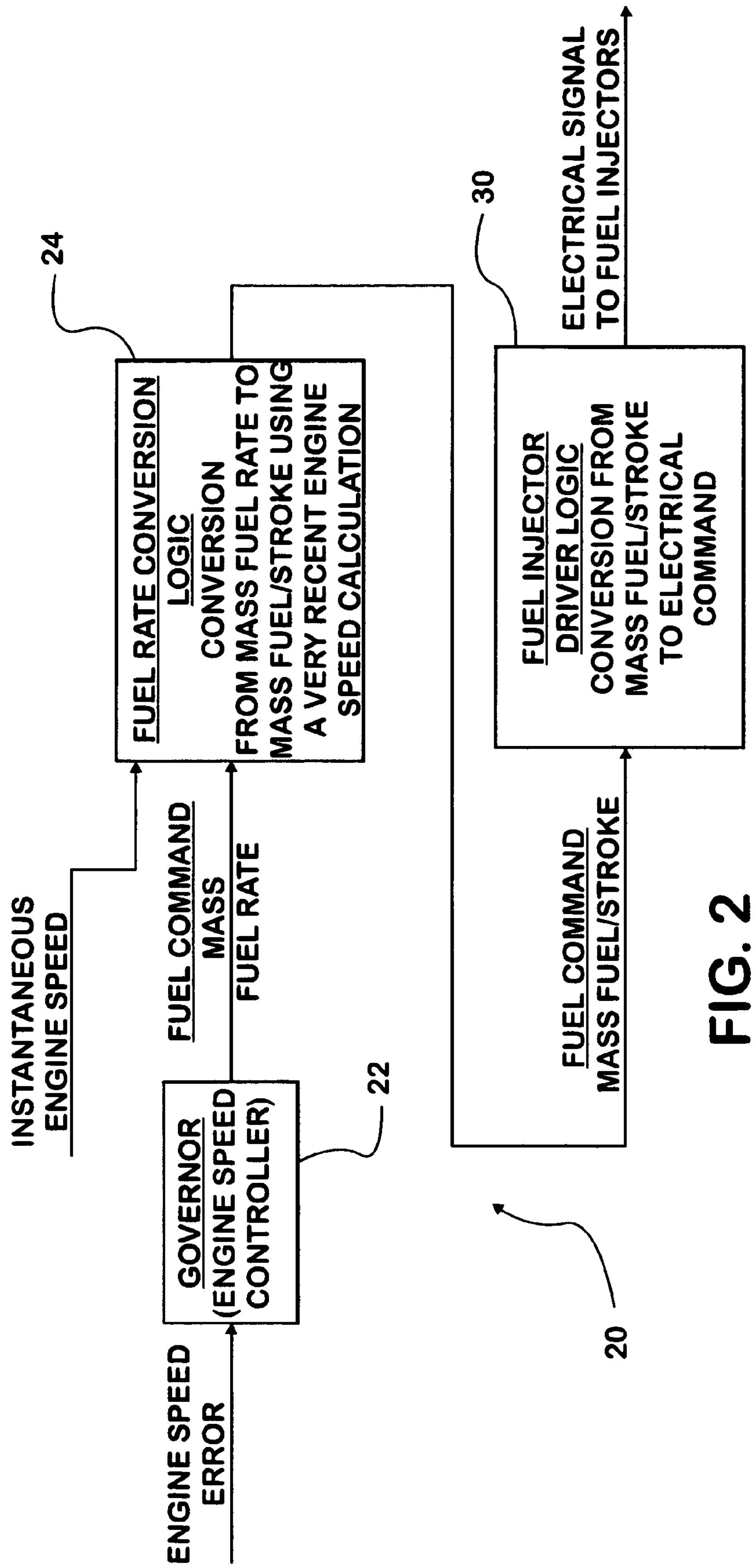
FIG. 2 is diagram of governing strategy in accordance with principles of the present invention.

FIG. 2 presents a governing strategy 20 in accordance with principles of the present invention. The strategy is implemented in an ECM where a governor 22 is implemented as a governor algorithm programmed into the processing system. Like governor 12, governor 22 processes the data value for engine speed error, but unlike governor 12, governor 22 yields a data value for engine fueling in terms of fuel rate, such as a mass fuel rate, in any appropriate unit of measurement, such as pounds per hour or grams per second.

That data value for engine fueling measured in terms of fuel rate forms one input to a fuel rate conversion logic 24. Another input to conversion logic 24 is the data value for actual engine speed. Conversion logic 24 processes the data value for mass fuel rate for governed fueling of the engine and the data value for actual engine speed to yield a data value for a quantity of fuel to be injected into an engine cylinder during an ensuing stroke of a piston within the cylinder. In contemporary processing systems, various strategies typically execute at various rates, some more frequently than others. It is to be understood that the use of the term “actual engine speed” means a very recent update of instantaneous engine speed by a strategy that measures engine speed.

Figure 3:
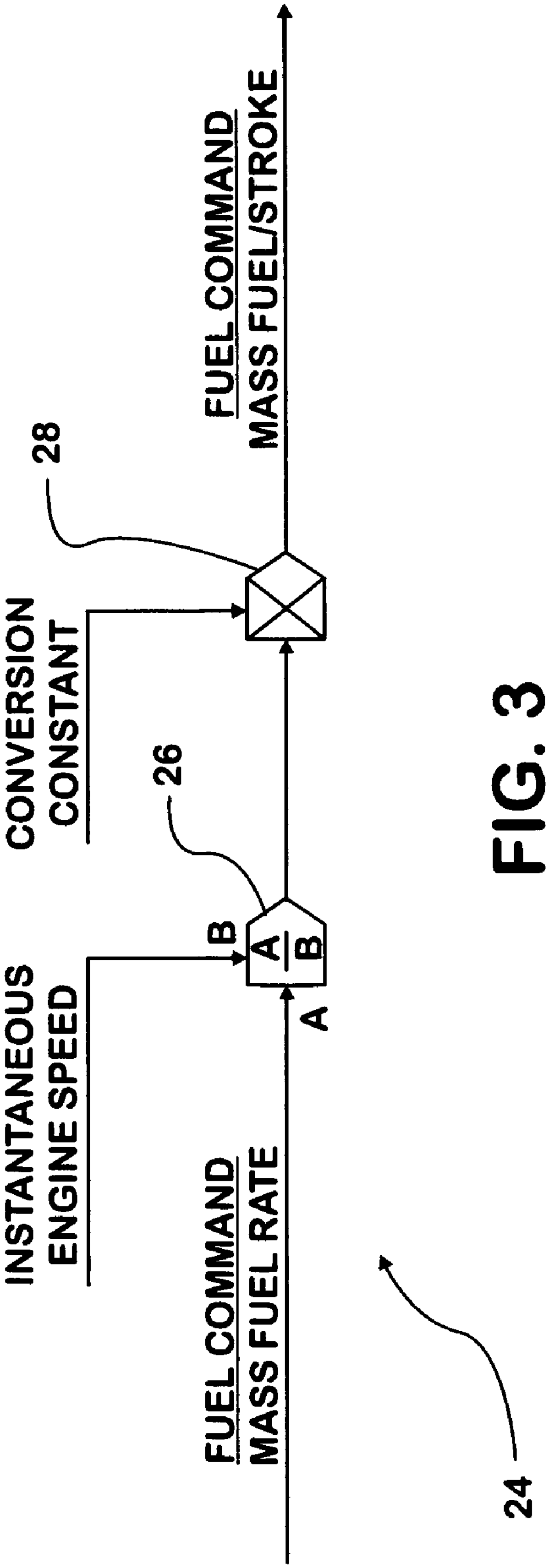
FIG. 3 is a more detailed diagram of a portion of the strategy of FIG. 2.

FIG. 3 shows the specific processing performed by conversion logic 24. A division function 26 divides the data value for mass fuel rate for governed fueling of the engine by the data value for actual engine speed. The quotient is a data value that is subsequently processed by a multiplication function 28 that operates to multiply the quotient by a conversion constant. The product is the data value for the quantity of fuel that is to be injected during the ensuing stroke.

Strategy 20 then communicates that data value to fuel injector driver logic 30, which may be contained in an ICM separate from the ECM. Driver logic 30 comprises an appropriate algorithm programmed into its processing system that ultimately operates each fuel injector via a respective electric signal so as to cause the quantity of fuel corresponding to the data value from conversion logic 24 to be injected into the respective cylinder during an ensuing stroke.

Figure 3A:
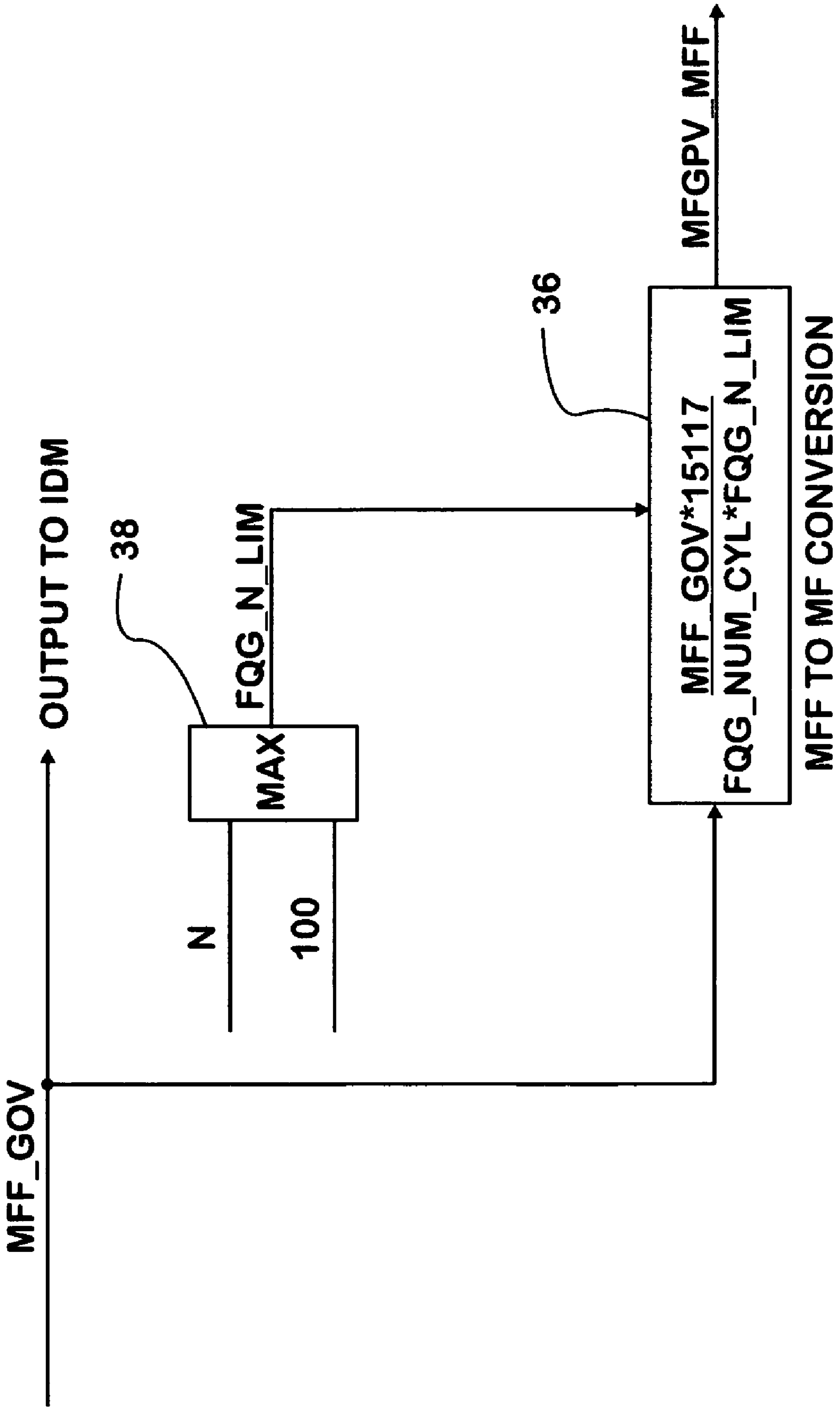
FIG. 3A is a detailed example for FIG. 3.

FIG. 3A shows a detailed example of the conversion processing of FIG. 3. The data value for the parameter MFF_GOV represents the governed mass fuel flow rate provided by the governor as measured in pounds of fuel per hour. An algorithm function 36 divides that data value by the product of the data values for parameters FQG_NUM_CYL, representing the number of engine cylinders, and FQG_N_LIM, representing engine speed, limited to avoid a possible divide-by-zero situation. The data value for FQG_N_LIM is set by a function 38 that selects the larger of actual engine speed N, as measured in revolutions per minute, and the number 100. The result is then multiplied by the conversion constant 15117 so that the data value for MFGOV_MFF representing fuel mass per stroke is given in units of milligrams per stroke.

If the governor is locked to a particular fuel rate, an increase in engine load that slows the engine will result in an increase in quantity of fuel per stroke, which is what the engine needs to handle the increased load. Likewise, a decrease in engine load that speeds up the engine will result in a decrease in quantity of fuel per stroke. In both cases the engine will settle to an equilibrium speed without instability.

The strategy of using fuel rate, rather than fuel quantity-per-stroke, as the basis for idle speed control of a diesel engine makes idle speed control inherently stable. This enables the engine to react to load applications or load dumps without overcompensating or excessive delay. The engine can handle load changes with reduced engine speed flair or bogging. The strategy also allows feed-forward compensation to be more effectively applied to idle speed control without risking engine runaway or stalling. Because the idle speed control does not have to provide an artificial stability at idle, the engine is less prone to bucking at off-idle operation. The inherent stability allows for smoother transitions immediately after engine starting. It enables the engine to be better characterized during the engine development process so that a new engine can be calibrated more reliably and more quickly. Larger phase shifts between separate control modules become tolerable.

Figure 4:
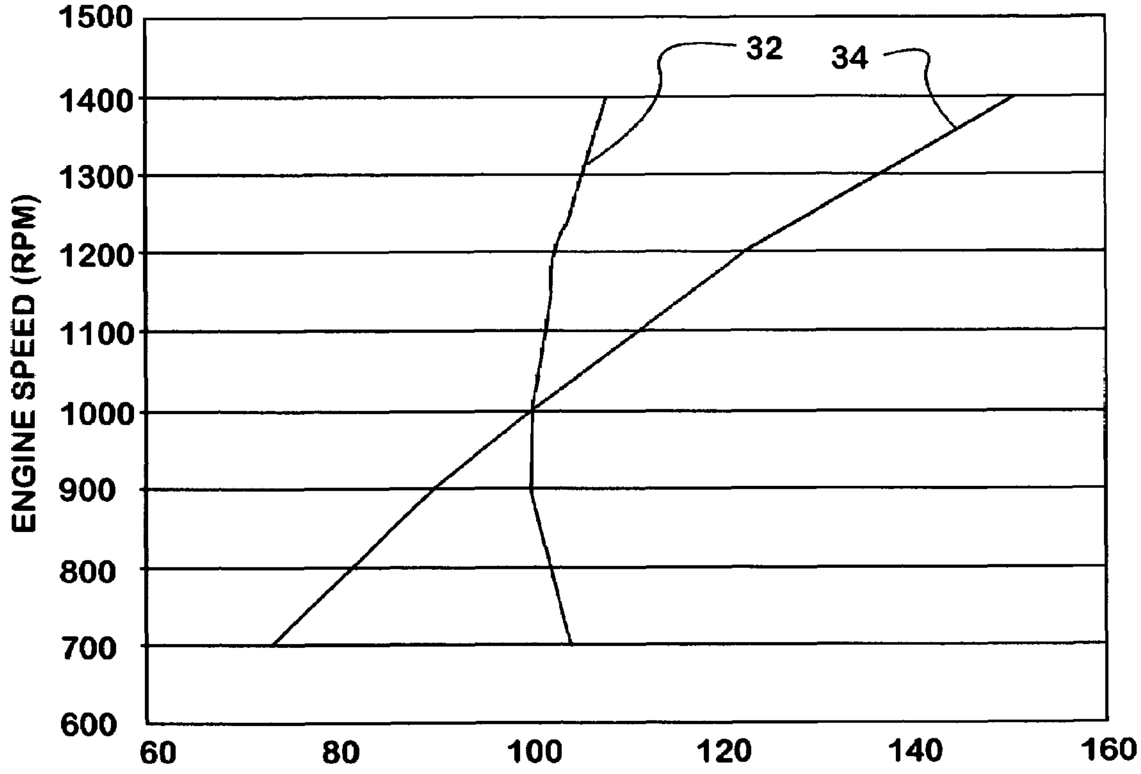
FIG. 4 is a graph plot useful in understanding how the inventive strategy is distinguished from the prior one.

FIG. 4 demonstrates that the inventive strategy provides inherent stability. That FIG. 4 is a graph plot comparing the inventive strategy of FIGS. 2 and 3 with the prior strategy of FIG. 1. Each of the two traces 32, 34 has been normalized from test data obtained during engine testing to the point of 100 percent fueling at 1000 rpm engine speed. Trace 32 shows fueling as a function of engine speed using the prior strategy. Trace 34 shows fueling as a function of engine speed using the inventive strategy.

Trace 34 has a reasonably constant positive slope so that each fueling value correlates uniquely with a respective speed value. That is not the case for trace 32.

Trace 32 has an irregular slope that is much steeper and actually negative in one region. The steeper slope means that small fueling changes can create large speed changes, and the presence of a negative slope region shows that each fueling value is not uniquely correlated with a respective engine speed.

Figure 5:
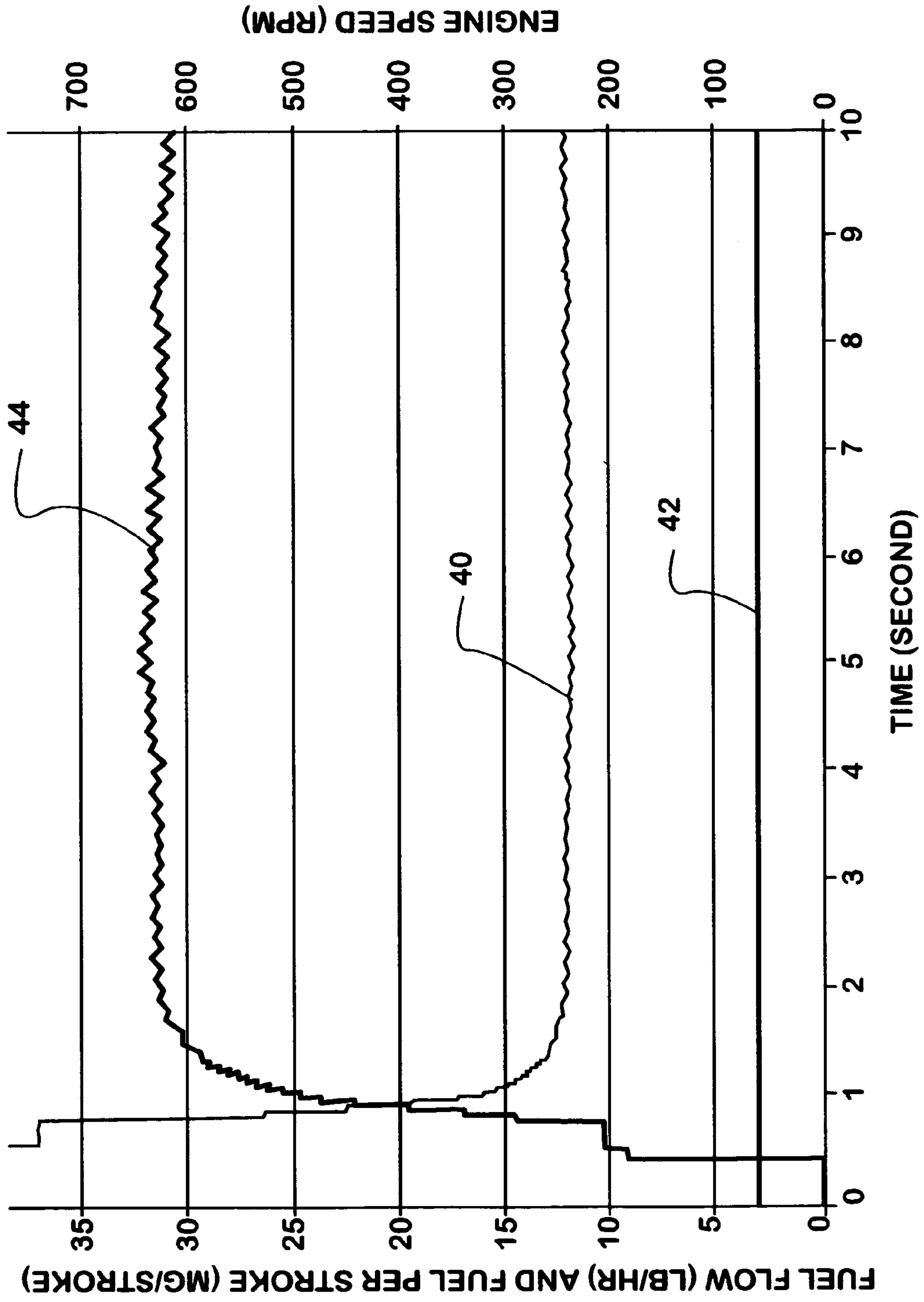
FIG. 5 is a graph plot showing engine fueling and engine speed during starting and initial running of an engine operating according to the governing strategy of the present invention.

FIG. 5 shows three traces 40, 42, 44 taken over a 10-second time interval at engine starting. Trace 40 represents engine fueling in terms of quantity-per-stroke; trace 42, engine fueling in terms of mass flow rate; and trace 44, engine speed.

Over that 10-second interval, the fuel flow governor provides a smooth engine start leading to stable idle speed as the fuel rate command from the governor (trace 42) is held constant. Engine speed (trace 44) rises asymptotically to a steady-state speed, slightly over 600 rpm in this instance. Fueling as measured in terms of quantity-per-stroke (trace 40) falls asymptotically as engine speed increases. The figure shows that engine speed will remain relatively steady when idling with a constant fuel flow command. Disturbances in engine speed, such as those due to load applications and load dumps, are inherently corrected to provide idle speed stability.

Figure 6:
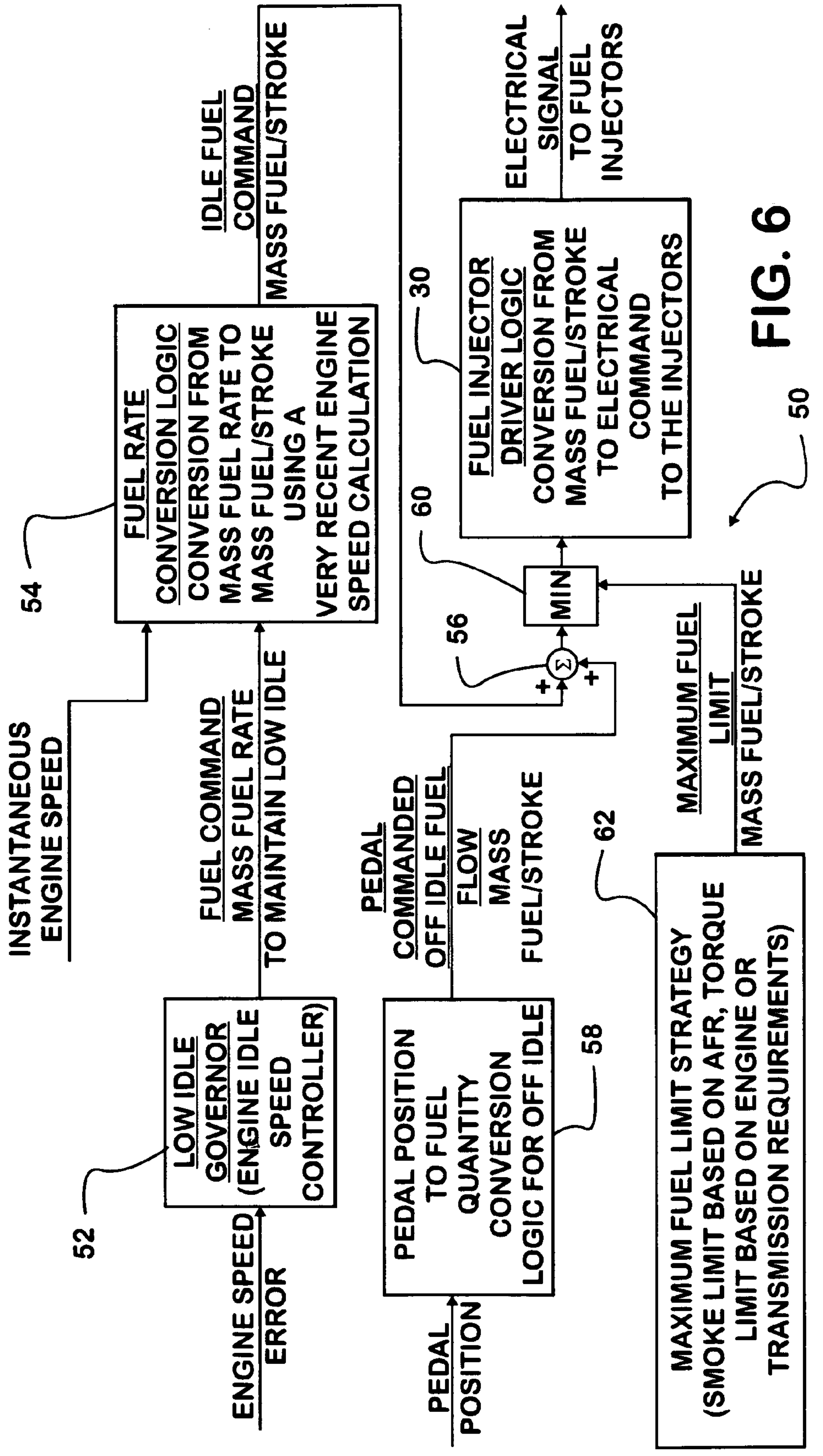
FIG. 6 is a diagram showing a form of the inventive governing strategy containing certain enhancements.

FIG. 6 presents an enhanced governing strategy 50 for low idle and engine acceleration from idle. Like strategy 20, strategy 50 is implemented in an ECM where a low-idle governor 52 is implemented as a low-idle governor algorithm programmed into the processing system. Governor 52 processes the data value for engine speed error, to yield a data value for engine low-idle fueling in terms of fuel rate, such as a mass fuel rate, in any appropriate unit of measurement, such as pounds per hour or grams per second.

That data value for engine fueling measured in terms of fuel rate forms one input to a fuel rate conversion logic 54. Another input to conversion logic 54 is the data value for actual engine speed. Conversion logic 54 processes the data values for those inputs in the manner described earlier for conversion logic 24 to yield a data value for a quantity of fuel to be injected into an engine cylinder during an ensuing stroke of a piston within the cylinder. The term "actual engine speed" continues to mean a very recent update of instantaneous engine speed by a strategy that measures engine speed.

The data value provided by conversion logic 54 is subject to further processing ahead of fuel injector driver logic 30. That processing comprises a summing function 56 that additively sums the data value provided by conversion logic 54 and a data value provided by a pedal position conversion logic 58.

Pedal position conversion logic 58 uses accelerator pedal position as an input, processing a data value derived from an accelerator position sensor (APS) that is operated by an accelerator pedal in a motor vehicle powered by an engine employing strategy 50 when a driver of the vehicle depresses the pedal. The data value provided by logic 58 is a fuel command measured as quantity-per-stroke in any appropriate units of measurement.

When the engine is running without the accelerator pedal being depressed, the data value supplied by logic 58 provides no additional contribution for summing function 56 to sum with the data value provided by logic 54. Consequently, it is the data value provided by logic 54 alone that is subsequently processed by a minimum selection function 60, a function that will be more fully explained later.

With the engine running in a steady state at low idle speed, depression of the accelerator pedal to accelerate the engine from low idle changes the APS data input to logic 58, causing logic 58 to yield a non-zero data value for summation by summing function 56 with the data value provided by logic 54. Both addends represent respective mass fuel rates in the same units of measurement.

By broadcasting the respective fuel commands from low-idle governor 52 and from logic 58 in different units of measurement, i.e. mass fuel rate and quantity-per-stroke respectively, rounding errors in the processing of data by governor 52 can be reduced and/or the processing time shortened. For low-idle running, the fuel command from governor 52 is characterized by both the quick response to disturbances and the fine resolution that are necessary for keeping low idle speed stable within a narrow speed range. For accelerating the engine from low idle, the pedal-initiated fueling command can span a much more extensive range of data values to handle the full range of engine operation where the need for quick response like that at low idle is typically absent.

If the pedal-initiated fuel command were to be broadcast as a fuel rate command, the range of values and the corresponding length of the fuel rate command data could easily become excessive. In such a case, the pedal-initiated fuel rate command would be multiplied by engine speed before it is broadcast, only to be divided by engine speed after it has been received. Multiplying such a pedal-initiated fuel rate command by engine speed and a constant to convert a quantity-per-stroke measurement into a mass rate measurement does not add value, but it does increase the length of the message that must be broadcast. For that reason, the pedal-initiated fuel rate command data in strategy 50 is broadcast by logic 58 on a quantity-per-stroke basis and then added to data from logic 54.

Minimum selection function 60 is essentially a limiter. A limit setting function 62 sets a maximum limit on engine fueling, in quantity-per-stroke units of measurement, on the basis of one or more factors that may call for fuel limiting under certain conditions. Examples of those factors are: tailpipe smoke and torque limiting. So long as the data value from summing function 56 is less than or equal to the limit set by the data value from function 62, the former is passed to fuel injector driver logic 30. Whenever the data value from summing function 56 is greater than the limit set by the data value from function 62, the latter is passed to fuel injector driver logic 30.

While a presently preferred embodiment of the invention has been illustrated and described, it should be appreciated that principles of the invention apply to all embodiments falling within the scope of the following claims.

What is claimed is:

1. A method for governing a compression ignition engine, the method comprising:

a) processing data values for actual engine speed and desired engine speed to yield a data value for engine speed error;

b) processing the data value for engine speed error according to a governor algorithm for yielding a data value for a mass fuel rate for governed fueling of the engine;

c) processing the data value for mass fuel rate for governed fueling of the engine and the data value for actual engine speed to yield a data value for a quantity of fuel to be injected into an engine cylinder during an ensuing stroke of a piston within the cylinder; and d) injecting that quantity of fuel into the cylinder during that stroke;

in which step c) comprises processing the data value for mass fuel rate for fueling the engine and the data value for actual engine speed such that i) an increase in the data value for actual engine speed relative to the data value for desired engine speed will cause the data value for a quantity of fuel to be injected into an engine cylinder during an ensuing stroke of a piston within the cylinder to decrease, and ii) and a decrease in the data value for actual engine speed relative to the data value for desired engine speed will cause the data value for a quantity of fuel to be injected into an engine cylinder during an ensuing stroke of a piston within the cylinder to increase.

2. A method as set forth in claim 1 in which step c) comprises dividing the data value for mass fuel rate for fueling the engine by the data value for actual engine speed and multiplying the data value for the quotient by a multiplier, and step d) comprises injecting fuel into the cylinder during the ensuing stroke in a quantity corresponding to the product of the multiplication.

3. A method as set forth in claim 2 in which the step of multiplying the data value for the quotient by a multiplier comprises multiplying the data value for the quotient by a constant.

4. A compression ignition internal combustion engine comprising:

a) multiple cylinders into which a fueling system injects fuel during engine cycles;

b) an engine control system that comprises a governor for governing the engine and a data processing system for processing various data useful an governing the engine including data values for actual engine speed and desired engine speed;

c) wherein the data processing system repeatedly i) processes the data values for actual engine speed and desired engine speed to yield data values for engine speed error, ii) processes the data values for engine speed error according to an algorithm for yielding data values for mass fuel rate for fueling the engine, iii) processes the data values for mass fuel rate for fueling the engine and the data values for actual engine speed to yield data values for quantities of fuel to be injected into the engine cylinders during ensuing strokes of pistons within the respective cylinders; and iv) causes the fueling system to inject those quantities of fuel into the respective cylinders during respective ensuing strokes; and in which the data processing system processes the data values for mass fuel rate for fueling the engine and the data values for actual engine speed such that i) increases in the data values for actual engine speed relative to the data values for desired engine speed will cause the data values for quantities of fuel to be injected into the engine cylinders during ensuing strokes of pistons within the respective cylinders to decrease, and ii) and decreases in the data values for actual engine speed relative to the data values for desired engine speed will cause the data values for quantities of fuel to be injected into the engine cylinders during ensuing strokes of pistons within the respective cylinders to increase.

5. An engine asset forth in claim 4 in which the data processing system processes the data values for mass fuel rate for fueling the engine and the data values for actual engine speed by dividing the data values for mass fuel rate for fueling the engine by the data values for actual engine speed and multiplying the data values for the quotients by a multiplier, and causes the fueling system to inject fuel into the respective cylinders during respective ensuing strokes in quantities corresponding to the products of the multiplications.

6. An engine as set forth in claim 5 in which the multiplier is a constant.

7. A control system for governing a compression ignition internal combustion engine having multiple cylinders into which a fueling system injects fuel during engine cycles, the control system comprising:

a) a data processing system for processing various data, including data values for actual engine speed and desired engine speed, according to an algorithm for governing the engine;

c) wherein the data processing system repeatedly i) processes the data values for actual engine speed and desired engine speed to yield data values for engine speed error, ii) processes the data values for engine speed error according to an algorithm for yielding data values for mass fuel rate for fueling the engine, iii) processes the data values for mass fuel rate for fueling the engine and the data values for actual engine speed to yield data values for quantities of fuel to be injected into the engine cylinders during ensuing strokes of pistons within the respective cylinders; and iv) commands the fueling system to inject those quantities of fuel into the respective cylinders during respective ensuing strokes; and in which the data processing system processes the data values for mass fuel rate for fueling the engine and the data values for actual engine speed such that i) increases in the data values for actual engine speed relative to the data values for desired engine speed will cause the data values for quantities of fuel to be injected into the engine cylinders during ensuing strokes of pistons within the respective cylinders to decrease, and ii) and decreases in the data values for actual engine speed relative to the data values for desired engine speed will cause the data values for quantities of fuel to be injected into the engine cylinders during ensuing strokes of pistons within the respective cylinders to increase.

8. A control system as set forth in claim 7 in which the data processing system processes the data values for mass fuel rate for fueling the engine and the data values for actual engine speed by dividing the data values for mass fuel rate for fueling the engine by the data values for actual engine speed and multiplying the data values for the quotients by a multiplier, and commands the fueling system to inject fuel into the respective cylinders during respective ensuing strokes in quantities corresponding to the products of the multiplications.

9. A control system as set forth in claim 8 in which the multiplier is a constant.

10. A method for governing idle speed of a compression ignition engine, the method comprising:

a) processing data values for actual engine speed and desired idle speed to yield a data value for speed error;

b) processing the data value for speed error according to an algorithm for yielding a data value for a mass fuel rate for fueling the engine;

c) processing the data value for mass fuel rate for fueling the engine and the data value for actual engine speed to yield a data value for a quantity of fuel to be injected into an engine cylinder during an ensuing stroke of a piston within the cylinder; and d) injecting that quantity of fuel into the cylinder during that stroke in which step c) comprises processing the data value for mass fuel rate for fueling the engine and the data value for actual engine speed such that i) an increase in the data value for actual engine speed relative to the data value for desired idle speed will cause the data value for a quantity of fuel to be injected into an engine cylinder during an ensuing stroke of a piston within the cylinder to decrease, and ii) and a decrease in the data value for actual engine speed relative to the data value for desired idle speed will cause the data value for a quantity of fuel to be injected into an engine cylinder during an ensuing stroke of a piston within the cylinder to increase.

11. A method as set forth in claim 10 in which step c) comprises dividing the data value for mass fuel rate for fueling the engine by the data value for actual engine speed and multiplying, the data value for the quotient by a multiplier, and step d) comprises injecting fuel into the cylinder during the ensuing stroke in a quantity corresponding to the product of the multiplication.

12. A method as set forth in claim 11 in which the step of multiplying the data value for the quotient by a multiplier comprises multiplying the data value for the quotient by a constant.

13. A compression ignition internal combustion engine comprising:

a) multiple cylinders into which a fueling system injects fuel during engine cycles;

b) an engine control system that comprises a governor for governing the engine and a data processing system for processing various data useful in governing the engine including data values for actual engine speed and desired idle speed;

c) wherein the data processing system repeatedly i) processes the data values for actual engine speed and desired idle speed to yield data values for idle speed error, ii) processes the data values for idle speed error according to an algorithm for yielding data values for mass fuel rate for fueling the engine, iii) processes the data values for mass fuel rate for fueling the engine and the data values for actual engine speed to yield data values for quantities of fuel to be injected into the engine cylinders during ensuing strokes of pistons within the respective cylinders; and iv) causes the fueling system to inject those quantities of fuel into the respective cylinders during respective ensuing strokes; and in which the data processing system processes the data values for mass fuel rate for fueling the engine and the data values for actual engine speed such that i) increases in the data values for actual engine speed relative to the data values for desired idle speed will cause the data values for quantities of fuel to be injected into the engine cylinders during ensuing strokes of pistons within the respective cylinders to decrease, and ii) and decreases in the data values for actual engine speed relative to the data values for desired idle speed will cause the data values for quantities of fuel to be injected into the engine cylinders during ensuing strokes of pistons within the respective cylinders to increase.

14. An engine as set forth in claim 13 in which the data processing system processes the data values for mass fuel rate for fueling the engine and the data values for actual engine speed by dividing the data values for mass fuel rate for fueling the engine by the data values for actual engine speed and multiplying the data values for the quotients by a multiplier, and causes the fueling system to inject fuel into the respective cylinders during respective ensuing strokes in quantities corresponding to the products of the multiplications.

15. An engine as set forth in claim 14 in which the multiplier is a constant.

16. A control system for governing a compression ignition internal combustion engine having multiple cylinders into which a fueling system injects fuel during engine cycles, the control system comprising:

a) a data processing system for processing various data, including data values for actual engine speed and desired idle speed, according to an algorithm for governing the engine;

c) wherein the data processing system repeatedly i) processes the data values for actual engine speed and desired idle speed to yield data values for idle speed error, ii) processes the data values for idle speed error according to an algorithm for yielding data values for mass fuel rate for fueling the engine, iii) processes the data values for mass fuel rate for fueling the engine and the data values for actual engine speed to yield data values for quantities of fuel to be injected into the engine cylinders during ensuing strokes of pistons within the respective cylinders; and iv) commands the fueling system to inject those quantities of fuel into the respective cylinders during respective ensuing strokes; and in which the data processing system processes the data values for mass fuel rate for fueling the engine and the data values for actual engine speed such that i) increases in the data values for actual engine speed relative to the data values for desired idle speed will cause the data values for quantities of fuel to be injected into the engine cylinders during ensuing strokes of pistons within the respective cylinders to decrease, and ii) and decreases in the data values for actual engine speed relative to the data values for desired idle speed will cause the data values for quantities of fuel to be injected into the engine cylinders during ensuing strokes of pistons within the respective cylinders to increase.

17. A control system as set forth in claim 16 in which the data processing system processes the data values for mass fuel rate for fueling the engine and the data values for actual engine speed by dividing the data values for mass fuel rate for fueling the engine by the data values for actual engine speed and multiplying the data values for the quotients by a multiplier, and commands the fueling system to inject fuel into the respective cylinders during respective ensuing strokes in quantities corresponding to the products of the multiplications.

18. A control system as set forth in claim 17 in which the multiplier is a constant.

19. A method for governing a compression ignition internal combustion engine having multiple cylinders into which a fueling system injects fuel during engine cycles, the method comprising:

operating a governor in a manner that sets a governed fuel flow rate in units measured in mass of fuel per unit of time.

20. A method as set forth in claim 19 including the further steps of processing various data useful in controlling the engine including the data value for the governed fuel flow rate set by the governor and a data value for actual engine speed to yield data values, measured in mass of fuel per stroke, for quantities of fuel to be injected into the engine cylinders during ensuing strokes of pistons within the respective cylinders, and causing the fueling system to inject those quantities of fuel into the respective cylinders during respective ensuing strokes.

21. A compression ignition internal combustion engine comprising:

a) multiple cylinders into which a fueling system injects fuel during engine cycles; and b) an engine control system that comprises a governor that sets a governed fuel flow rate in units measured in mass of fuel per unit of time.

22. An engine as set forth in claim 21 in which the control system comprises a data processing system for processing various data useful in controlling the engine including the data value for the governed fuel flow rate set by the governor and a data value for actual engine speed to yield data values, measured in mass of fuel per stroke, for quantities of fuel to be injected into the engine cylinders during ensuing strokes of pistons within the respective cylinders.

23. An engine as set forth in claim 22 in which the control system further causes the fueling system to inject those quantities of fuel into the respective cylinders during respective ensuing strokes.

24. A control system for a compression ignition internal combustion engine that has multiple cylinders into which a fueling system injects fuel during engine cycles, the control system comprising:

a governor that sets a governed fuel flow rate in units measured in mass of fuel per unit of time.

25. A control system as set forth in claim 24 in which the control system comprises a data processing system for processing various data useful in controlling the engine including the data value for the governed fuel flow rate set by the governor and a data value for actual engine speed to yield data values, measured in mass of fuel per stroke, for quantities of fuel to be injected into the engine cylinders during ensuing strokes of pistons within the respective cylinders.

26. A control system as set forth in claim 25 in which the control system further issues a command for causing the fueling system to inject those quantities of fuel into the respective cylinders during respective ensuing strokes.

27. A compression ignition internal combustion engine comprising:

a) multiple cylinders into which a fueling system injects fuel during engine cycles; and b) an engine control system that comprises i) a low-idle governor for governing engine fueling to run the engine at low idle speed by issuing a fueling command measured in fueling rate units of measurement, ii) a conversion function for converting the fueling command from fueling rate units of measurement to quantity-per-stroke units of measurement, and iii) an accelerator for accelerating the engine from low idle speed by issuing a fueling command measured in quantity-per-stroke units of measurement, that when the engine is running at low idle speed, causes fuel to be injected into the cylinders in quantities-per-stroke set by the conversion function, and that when the engine is accelerated from low idle speed utilizes the fueling command from the accelerator in setting the quantities-per-stroke injected into the cylinders.

28. An engine as set forth in claim 27 in which the control system comprises a summing function that additively sums the quantity-per-stroke measurement set by the conversion function and the quantity-per-stroke measurement set by the accelerator, and then uses the sum to set the quantity-per-stroke injected into a cylinder.

29. An engine as set forth in claim 28 in which the control system comprises a fuel limit setting function for setting a maximum fuel limit and a minimum selection function that selects from a quantity-per-stroke maximum fuel limit set by the fuel limit setting function and the sum, one having the same or lower value, and then uses the selection to set the quantity-per-stroke injected into a cylinder.

30. A control system for a compression ignition internal combustion engine having multiple cylinders into which a fueling system injects fuel during engine cycles, the control system comprising:

i) a low-idle governor for governing engine fueling to run the engine at low idle speed by issuing a fueling command measured in fueling rate units of measurement, ii) a conversion function for converting the fueling command from fueling rate units of measurement to quantity-per-stroke units of measurement, and iii) an accelerator for accelerating the engine from low idle speed by issuing a fueling command measured in quantity-per-stroke units of measurement, for causing fuel to be injected into the cylinders in quantities-per-stroke set by the conversion function when the engine running at low idle speed, and for utilizing the fueling command from the accelerator in setting the quantities-per-stroke injected into the cylinders when the engine is accelerated from low idle speed.

31. A control system as set forth in claim 30 further comprising a summing function that additively sums the quantity-per-stroke measurement set by the conversion function and the quantity-per-stroke measurement set by the accelerator, and then uses the sum to set the quantity-per-stroke injected into a cylinder.

32. A control system as set forth in claim 31 further comprising a fuel limit setting function for setting a maximum fuel limit and a minimum selection function that selects from a quantity-per-stroke maximum fuel limit set by the fuel limit setting function and the sum, one having the same or lower value, and then uses the selection to set the quantity-per-stroke injected into a cylinder.

33. A method for low-idle governing and subsequent acceleration of a compression ignition engine having multiple cylinders into which a fueling system injects fuel during engine cycles, the method comprising:

a) governing engine fueling to run the engine at low idle speed i) by processing data to yield a data value for a fueling command measured in fueling rate units of measurement for governing engine fueling to run the engine at low idle speed, ii) by processing data to convert the data value for the low-idle fueling command from fueling rate units of measurement to quantity-per-stroke units of measurement, and iii) by causing fuel to be injected into the cylinders in quantities-per-stroke resulting from the conversion, and b) accelerating the engine from low idle speed i) by processing data from an accelerator to yield a fueling command measured in quantity-per-stroke units of measurement, and ii) by utilizing the fueling command from the accelerator in setting the quantities-per-stroke injected into the cylinders.

34. A method as set forth in claim 33 further comprising additively summing the quantity-per-stroke measurement set by the conversion and the quantity-per-stroke measurement set by the accelerator, and then using the sum to set the quantity-per-stroke injected into a cylinder.

35. A method as set forth in claim 34 further comprising setting a quantity-per-stroke maximum fuel limit and selecting from the quantity-per-stroke maximum fuel limit set and the sum, one having the same or lower value, and then using the selection to set the quantity-per-stroke injected into a cylinder.

* * * * *